United States Patent [19]

Xiao

[11] Patent Number: 6,132,040
[45] Date of Patent: Oct. 17, 2000

[54] AUXILIARY INTERLOCKING FRAME FOR EYEGLASSES

[76] Inventor: Tony Xin Xiao, 1235 Lindengrove Ave., Rowland Heights, Calif. 91748

[21] Appl. No.: 09/290,827

[22] Filed: Apr. 13, 1999

[51] Int. Cl.[7] .................................................. G02C 9/00
[52] U.S. Cl. .............................................. 351/47; 351/57
[58] Field of Search ............................. 351/47, 57, 48, 351/58, 41

[56] References Cited

U.S. PATENT DOCUMENTS

| | | | |
|---|---|---|---|
| 5,416,537 | 5/1995 | Sadler | 351/57 |
| 5,642,177 | 6/1997 | Nishioka | 351/47 |
| 5,696,571 | 12/1997 | Spencer et al. | 351/47 |
| 5,737,054 | 4/1998 | Chao | 341/47 |
| 5,975,691 | 11/1999 | Ku | 381/47 |

*Primary Examiner*—Hung Xuan Dang
*Attorney, Agent, or Firm*—Raymond Y. Chan; David and Raymond

[57] ABSTRACT

An auxiliary interlocking frame is adapted for mounting on primary eyeglasses. The primary eyeglasses include a frame for mounting a pair of lenses in position. The frame includes a bridge connected between the two lenses, and two magnetic side extensions each having a hinge portion extended rearwardly therefrom for pivotally coupling a temple. The auxiliary interlocking frame for supporting two auxiliary lenses includes a clip-bridge which is extended between the two auxiliary lenses for fitting behind the bridge of the frame of the primary eyeglasses, and two side interlocking devices which are provided at two outer sides of the two auxiliary lenses respectively for interlocking with the two magnetic side extensions of the frame so as to securely mount the auxiliary interlocking frame on the primary eyeglasses in detachable manner.

16 Claims, 16 Drawing Sheets

AUXILIARY INTERLOCKING FRAME FOR EYEGLASSES

FIELD OF THE PRESENT INVENTION

The present invention relates to eyeglasses, and more particularly to an auxiliary interlocking frame for supporting auxiliary lenses, such as a sunglasses, which is adapted to detachably mount on a primary eyeglasses through magnetic means and interlocking engagement.

BACKGROUND OF THE PRESENT INVENTION

Clip-on sunglasses comprises a spectacle frame with clipping claws adapted for firmly mounting on a shortsighted or farsighted eyeglasses, so that the wearer does not need to have another pair of shortsighted or farsighted sunglasses. However, the wearer must take down his and her primary eyeglasses and requires both hand operations in order to correctly mount the clip-on sunglasses on the primary eyeglasses. Such mounting operation is impossible when the wearer is driving. Moreover, the metal made clipping claws will scratch on the lenses of the primary eyeglasses during the mounting operation.

In order to solve the problems of the above mentioned clip-on sunglasses, magnetic attachment is recently introduced into the eyeglasses industry. For, example, U.S. Pat. No. 5,568,207 suggests spectacle frames comprising a primary spectacle frame having a primary pair of magnet members provided on the two upper side extensions respectively, and an auxiliary spectacle frame such as a sunglasses including a pair of arms for engaging over the two upper side extensions for preventing the auxiliary spectacle frame from moving downward relative to the primary spectacle frame and having an auxiliary pair of magnet members for engaging with the primary magnet members of the primary spectacle frame and for stably attaching the auxiliary spectacle frame to the primary spectacle frame. However, the users have to align two pair of magnet members. If the auxiliary magnet members of the sunglasses are misaligned with the primary magnet members of the primary spectacle frame, the sunglasses will fall down from the primary spectacle frame accidentally and easily.

Other U.S. patents such as U.S. Pat. Nos. 5,416,537, 5,642,177, and 5,737,054 all provide an attachable sunglasses adapted to be attached on a primary eyeglasses through magnetic members.

In U.S. Pat. No. 5,416,537, a pair of magnet members are engaged on two top corners of the primary frame so that a sunglasses frame having another pair of magnet members affixed on respective top corners thereof can be attached in front of the primary frame. However, the front magnet members on the primary frame may destroy the entire ornamental appearance of the primary frame.

In U.S. Pat. No. 5,642,177, although the front magnet members are moved to two side extensions. It still bears similar drawbacks of adversely affecting the appearance of the eyeglasses.

In U.S. Pat. No. 5,737,054, it tries to save the cost of two magnet members. However, the alignment of the front auxiliary lenses becomes more difficult and the attachment of the front auxiliary lenses becomes unstable too. A slightly head shake may cause the auxiliary lenses off position or even falling down.

Furthermore, all conventional magnetic attachable sunglasses as mentioned above have a serious common shortcoming that makes the magnetic attachable sunglasses still can not work better than a clip-on sunglasses, i.e. the magnetic attachable sunglasses may easily drop off when the wearer does exercise or is fast moving. It may fall down during jumping, running or head shaking. In other words, such magnetic attachable sunglasses are unsuitable to be used during sporting activities. However, all users especially need sunglasses during outdoor sports or exercising. Moreover, the conventional magnetic attachable sunglasses will fall down when the two temples are stretched apart. Therefore, such magnetic attachable sunglasses do not fit to most sporters or some people who have wide faces.

Besides, the weight of the eyeglasses is heavier than usual because of the additional magnet members installed thereon for ensuring magnetic attraction with the sunglasses. Also, the magnet members on the primary frame, according to the prior arts, adversely affect the entire ornamental appearance of the primary frame.

SUMMARY OF THE PRESENT INVENTION

The main object of the present invention is to provide an auxiliary interlocking frame for eyeglasses, wherein the auxiliary interlocking frame can be easily and precisely mounted on primary eyeglasses due to the magnetic attachments. But, once the auxiliary interlocking frame is mounted on the primary eyeglasses, it is interlocked with the primary eyeglasses in at least five directions, so as to prevent the auxiliary interlocking frame from moving or detaching from the primary eyeglasses in downward, inward, outward, leftward, and rightward directions.

Another object of the present invention is to provide an auxiliary interlocking frame for mounting on, wherein the auxiliary interlocking frame is interlocked with the primary eyeglasses in all directions by further comprising a pair of locking tails extended from a bottom end of the two magnetic seat respectively, so as to prevent the auxiliary interlocking frame from moving or detaching from the primary eyeglasses in downward, upward, inward, outward, leftward, and rightward directions.

Another object of the present invention is to provide an auxiliary interlocking frame for mounting on, wherein all magnet members are arranged in hidden position, so that no magnet member can be seen in front. The ornamental design of the eyeglasses as well as the auxiliary interlocking frame will not be affected or limited due to the presence of the magnet members.

Another object of the present invention is to provide an auxiliary interlocking frame for mounting on, wherein since the auxiliary interlocking frame is interlocked with the primary eyeglasses, the two magnetic side extensions of the primary eyeglasses can be simply made of metal having magnetic attraction ability, such as iron that is attracted to magnet but not normal metal, so as to further reduce the weight of the primary eyeglasses and provide an ornamental appearance just like a regular eyeglasses.

Another object of the present invention is to provide an auxiliary interlocking frame for mounting on, wherein the clip-bridge of the auxiliary interlocking frame is arranged to capable of clipping on the bridge of the primary eyeglasses, so as to more securely mount the auxiliary interlocking frame on the primary eyeglasses and better prevent the auxiliary interlocking frame from moving downwardly, leftwardly, rightwardly and outwardly.

Another object of the present invention is to provide an auxiliary interlocking frame for mounting on, wherein the auxiliary interlocking frame can be detached from the primary eyeglasses easily and rapidly with one hand only. Also, the wearer may merely use one hand, during driving or exercising, to put on the auxiliary interlocking frame, wherein when the wearer holds the auxiliary interlocking frame close in front of the primary eyeglasses and drops down, the primary pair of magnet members provided on the primary eyeglasses and/or the corresponding auxiliary pair of magnet members provided on the auxiliary interlocking frame will guide and attract the auxiliary interlocking frame to perfectly mount on the primary eyeglasses.

In order to accomplish the above objects, the present invention provides an auxiliary interlocking frame adapted for mounting on primary eyeglasses. The primary eyeglasses comprise a frame means for mounting a pair of lenses in position. The frame means comprises a bridge connected between the two lenses, and two magnetic side extensions each having a hinge portion extended rearwardly therefrom for pivotally coupling a temple.

The auxiliary interlocking frame for supporting two auxiliary lenses comprises a clip-bridge which is extended between the two auxiliary lenses for fitting behind the bridge of the frame means of the primary eyeglasses, and two side interlocking means which are provided at two outer sides of the two auxiliary lenses respectively for interlocking with the two magnetic side extensions of the frame means so as to securely mount the auxiliary interlocking frame on the primary eyeglasses.

Each of the two side interlocking means comprises a rider arm extended rearwardly for supporting on top of the respective magnetic side extension of the frame means of the primary eyeglasses, and a magnetic seat downwardly extended from a rear end of the rider arm. When the two rider arms ride on the two magnetic side extensions respectively, the two magnetic seats will attract from behind with the two side extensions of the frame means of the primary eyeglasses respectively so as to guide the auxiliary interlocking frame firmly engaging with the primary eyeglasses in interlocking manner.

For better interlocking effect, each of the interlocking means can further comprises a locking tail frontwardly extended from a bottom end of the magnetic seat. The locking tails are extended to support under the two side extensions of the frame means respectively so as to prevent the auxiliary interlocking frame from moving upwards. In order to detach the auxiliary interlocking frame from the primary eyeglasses, the wearer must push the auxiliary interlocking frame rearwardly to separate the magnetic attraction between the two magnetic seats and the two side extensions and then lift up the auxiliary interlocking frame.

Accordingly, the magnetic attraction plus the interlocking means of the present invention ensure a firm and secure connection between the auxiliary interlocking frame and the primary eyeglasses that can prevent the auxiliary interlocking frame from dropping off even when the wearer does exercise or is fast moving. In other words, besides magnetic attraction, the auxiliary interlocking frame is interlocked with the primary eyeglasses so as to ensure the auxiliary interlocking frame will not fall down during sporting activities, such as jumping, running or head shaking.

DETAILED DESCRIPTION OF THE PREFERRED EMBODIMENTS

Figure 1A:
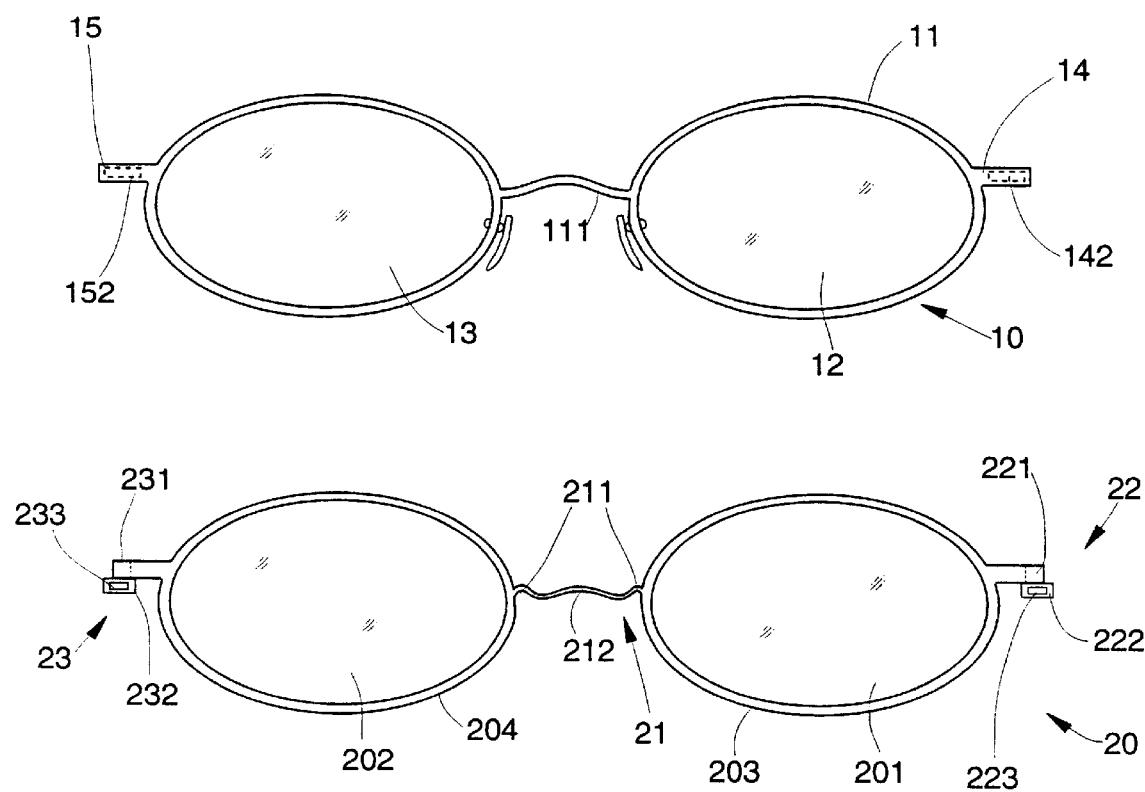
FIG. 1A is a front view of an auxiliary interlocking frame for mounting on in separate condition according to a first preferred embodiment of the present invention.

Referring to FIGS. 1 to 4 of the drawings, an auxiliary interlocking frame 20 adapted for mounting on a primary eyeglasses 10 according to a first preferred embodiment of the present invention is illustrated. The primary eyeglasses 10 comprises a frame means 11 for mounting a pair of lenses 12, 13 in position. The frame means 11 comprises a bridge 111 connected between the two lenses 12, 13, and two magnetic side extensions 14, 15 each having a hinge portion 141, 151 extended rearwardly therefrom for pivotally coupling a temple 112, 113.

Practically, the frame means 11 can be a conventional spectacle frame comprising a pair of rims as shown in FIG.

Figure 1B:
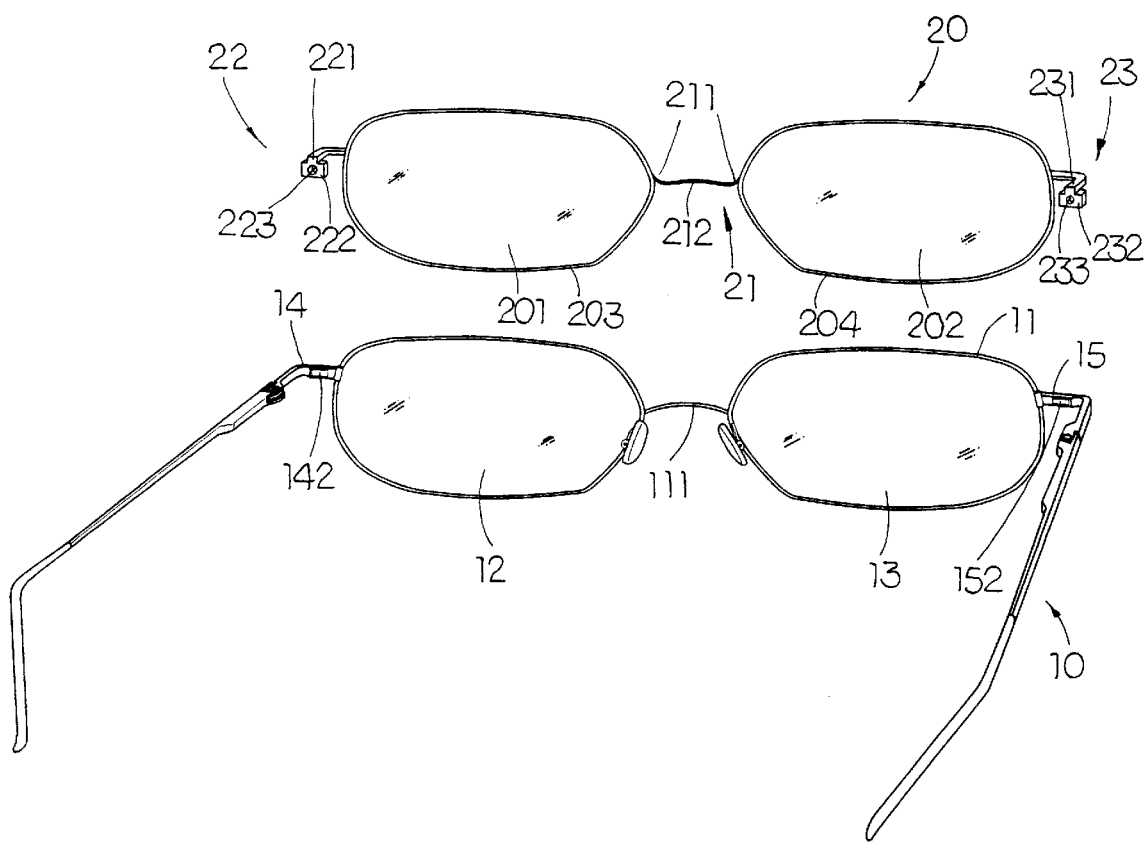
FIG. 1B is a rear perspective view illustrating an alternative mode of the auxiliary interlocking frame for another style of eyeglasses, in detached condition, according to the above first preferred embodiment of the present invention.

1 or a rimless frame that the bridge 111 and the two side extensions 14, 15 are directly fastened to the edges of the two lenses. The major different between the frame means 11 of the present invention and the conventional spectacle frame is that the two magnetic side extensions 14, 15 are made of metal having magnetic attraction ability (such as iron) that is attracted to magnet but not normal metal. Alternatively, two magnet members 142, 152 are embedded on the rear sides of the two side extensions 14, 15 respectively, as shown in FIGS. 1 and 2, so as to provide magnetic property.

The auxiliary interlocking frame 20 for supporting two auxiliary lenses 201, 202 comprises a clip-bridge 21 which is extended between the two auxiliary lenses 201, 202 for fitting behind the bridge 111 of the frame means 11 of the primary eyeglasses 10, and two side interlocking means 22, 23 which are provided at two outer sides of the two auxiliary lenses 201, 202 respectively for interlocking with the two magnetic side extensions 14, 15 of the frame means 11 so as to securely mount the auxiliary interlocking frame 20 on the primary eyeglasses 10. The two auxiliary lenses 201, 202 can be shaded lenses supported by the auxiliary interlocking frame 20 to form a detachable sunglasses.

Each of the two side interlocking means 22, 23 comprises a rider arm 221, 231 extended rearwardly for supporting on top of the respective magnetic side extension 14, 15 of the frame means 11 of the primary eyeglasses 10, and a magnetic seat 222, 232 downwardly extended from a rear end of the rider arm 221, 231. Similarly, the two magnetic seat 222, 232 each can be made of magnetized material or embedded with a magnet member 223, 233 on a front face thereof as shown in FIG. 2.

Figure 2A:
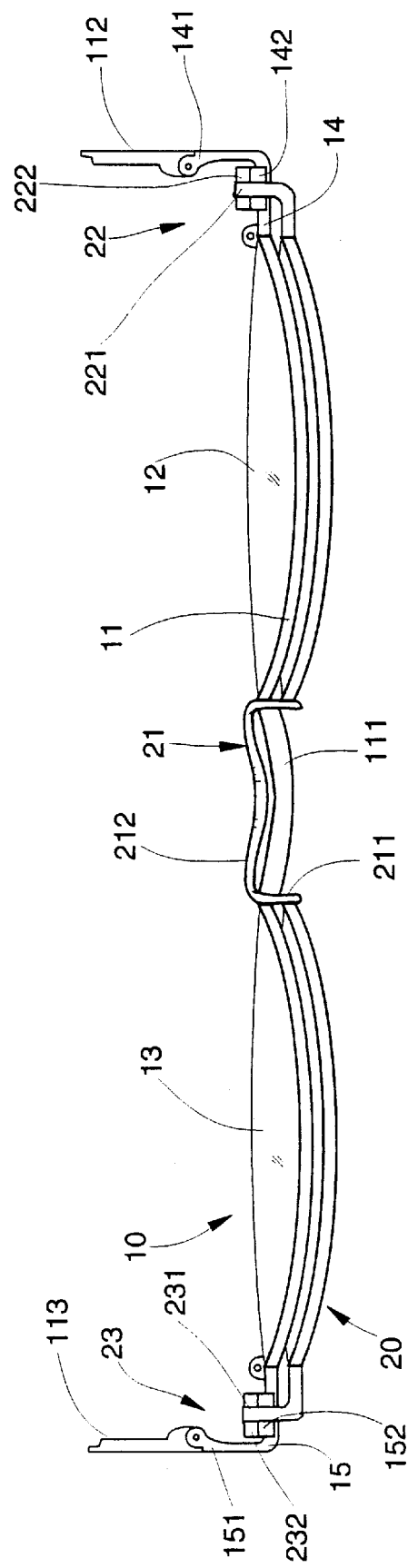
FIG. 2A is a plan view illustrating the auxiliary interlocking frame mounted on the eyeglasses according to the above first preferred embodiment of the present invention.
Figure 2B:
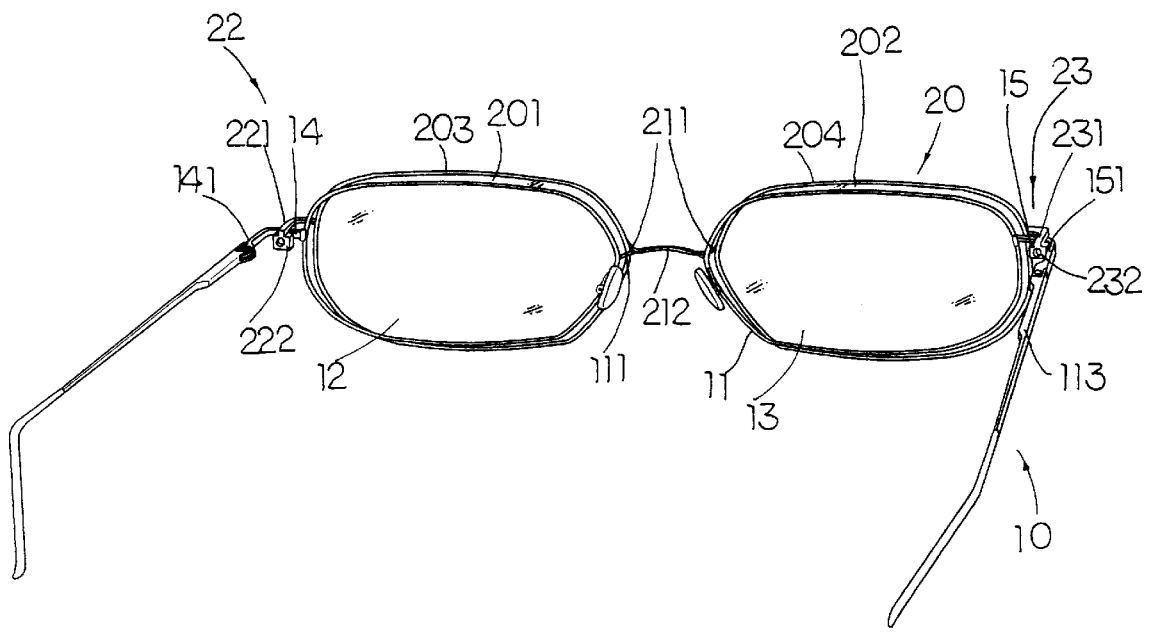
FIG. 2B is a rear perspective view illustrating the alternative mode where the auxiliary interlocking frame is mounted on the eyeglasses as shown in FIG. 1A.
Figure 3:
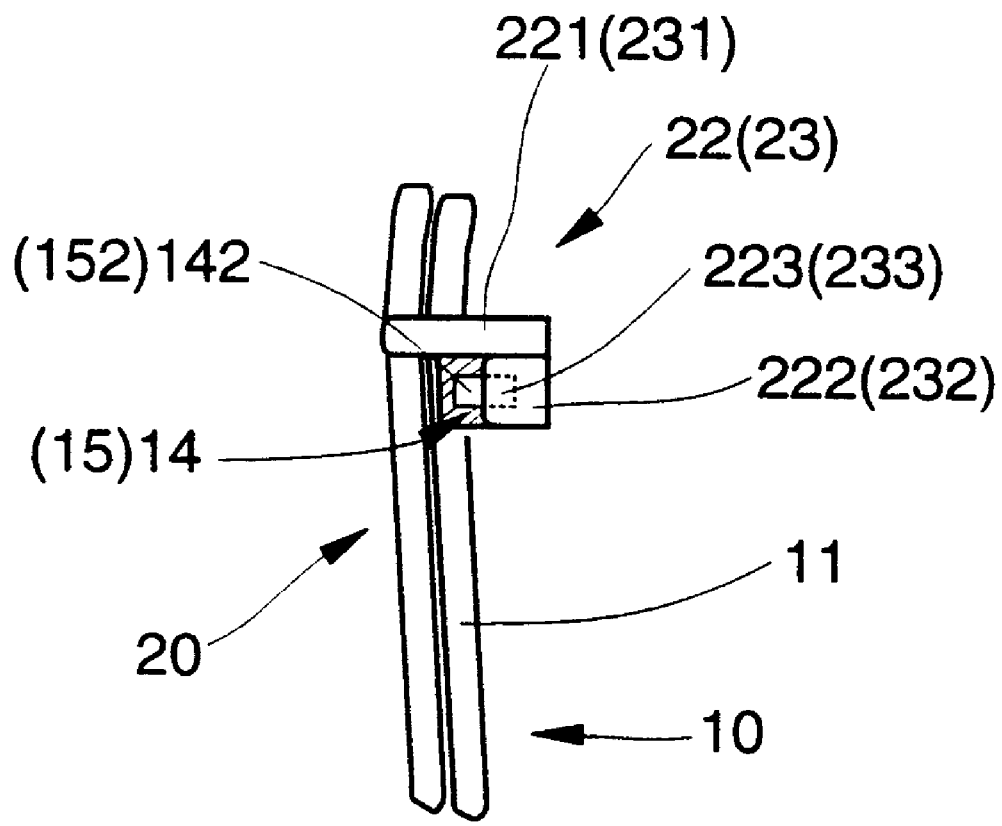
FIG. 3 is a sectional end view illustrating the auxiliary interlocking frame mounted on the eyeglasses according to the above first preferred embodiment of the present invention.

As shown in FIGS. 2 and 3, when the two rider arms 221, 231 ride on the two magnetic side extensions 14, 15 respectively, the two magnetic seats 222, 232 will attract from behind with the two magnetic side extensions 14, 15 of the frame means 11 of the primary eyeglasses 10 respectively so as to guide the auxiliary interlocking frame 20 firmly engaging with the primary eyeglasses 10 in interlocking manner.

Figure 4:
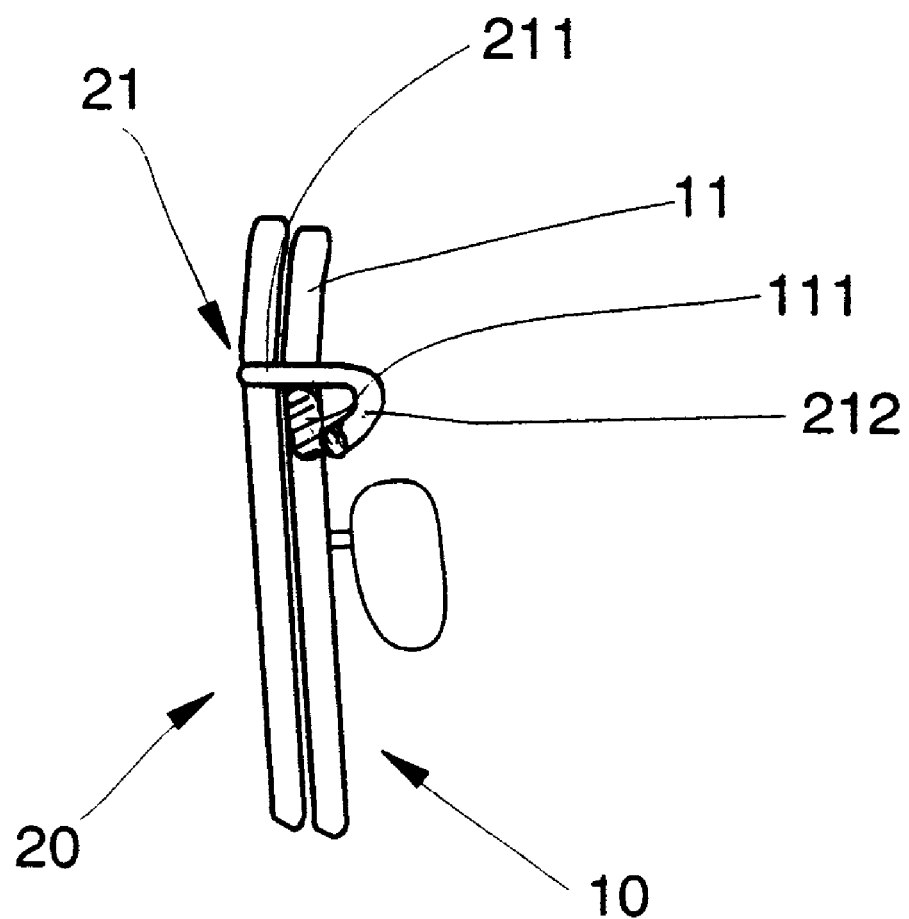
FIG. 4 is a sectional end view illustrating the clipping connection between the clip-bridge of the auxiliary interlocking frame and the bridge of the primary eyeglasses of the present invention.

Moreover, as shown in FIGS. 2 and 4, the clip-bridge 21 is in U-shaped that comprises two rearwardly extending side wires 211 adapted for supporting on two ends of the bridge 111 and a downwardly curved clipping wire 212 extending behind the bridge 111, so that the clip-bridge 21 is clipped on the bridge 111 when the auxiliary interlocking frame 20 is mounted on the primary eyeglasses 10.

Figure 14:
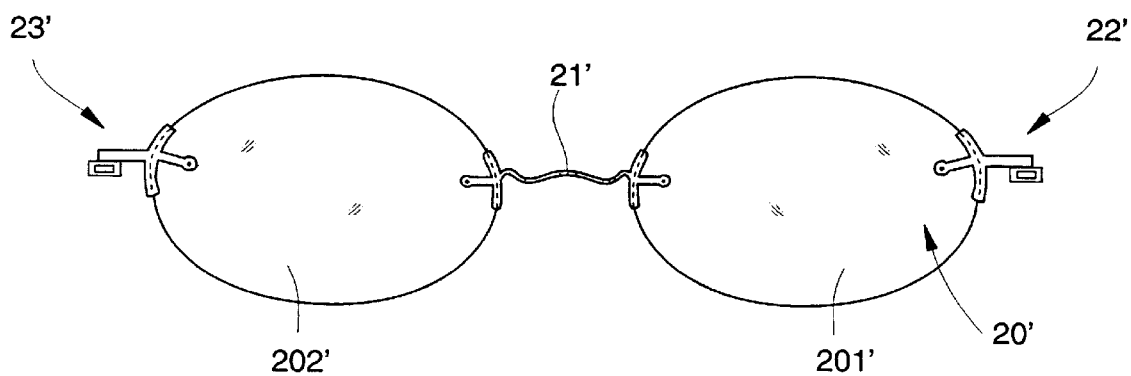
FIG. 14 is a front view of a rimless auxiliary interlocking frame illustrating an alternative mode of the above embodiments according to the present invention.

The auxiliary interlocking frame 20 further comprises a pair of rims 203, 204 for engaging the two auxiliary lenses 201, 202 therein. Of course, the auxiliary interlocking frame 20 can also be a rimless auxiliary interlocking frame 20' as shown in FIG. 14, wherein the clip-bridge 21' and the two magnetic seats 22', 23' are directly screwed to the edges of the two auxiliary lenses 201', 202'.

Referring to FIGS. 2 to 4, the mounting relationship between the auxiliary interlocking frame 20 and the primary eyeglasses 10 is an interlocking configuration that the auxiliary interlocking frame 20 is prevented from falling down or dropping off from the primary eyeglasses 10 in five directions. The two side wires 211 of the clip-bridge 21 and the two rider arms 221, 231 of the side interlocking means 22, 23 support the auxiliary interlocking frame 20 to prevent downward movement. The clip-bridge 21 and the two magnetic seats 222, 232 also block all possible left or right movement of the auxiliary interlocking frame 20. Moreover, the two magnetic seats 222, 223 and the clipping wire 212 engage the auxiliary interlocking frame 20 with the primary eyeglasses 10 so as to limit frontward movement and rearward movement of the auxiliary interlocking frame 20. Accordingly, the auxiliary interlocking frame 20 is firmly and stably interlocked with the primary eyeglasses mechanically so that no downward, leftward, or rightward movement is allowed and the frontward movement and rearward movement are limited. Moreover, the magnetic seats 222, 232 are attracted to the two magnetic side extensions 14, 15 from behind, that helps to prevent the unwanted upward movement of the auxiliary interlocking frame 20.

In order to put on the auxiliary interlocking frame 20, the wear merely needs to bring the auxiliary interlocking frame 20 close to the primary eyeglasses 10 and drop it down. The magnetic attraction between the magnetic seats 222, 232 and the magnetic side extensions 14, 15 will guide the auxiliary interlocking frame 20 precisely mounted in position. To detach the auxiliary interlocking frame 20 is as easy as simply hold it up to separate the magnetic attraction between the magnetic seats 222, 232 and the magnetic side extensions 14, 15.

Figure 5:
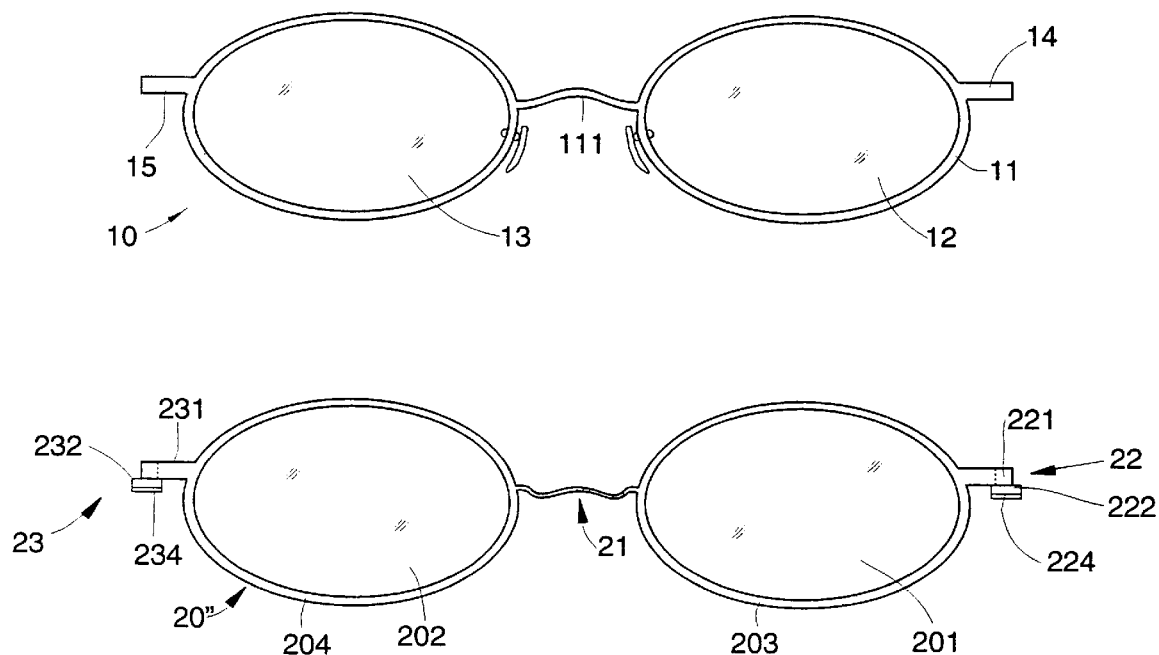
FIG. 5 is front view of an auxiliary interlocking frame for an mounting on in separate condition according to a second preferred embodiment of the present invention.
Figure 6:
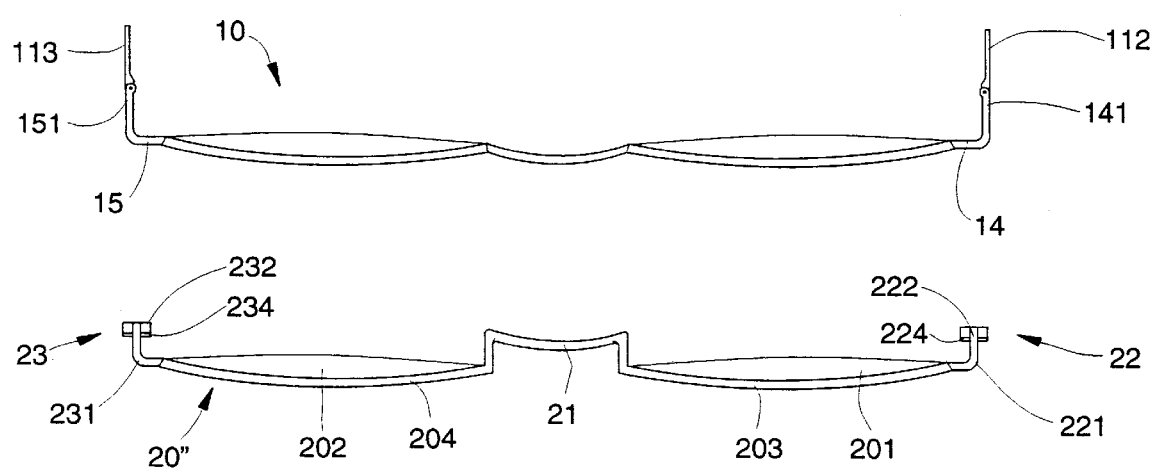
FIG. 6 is a plan view of the auxiliary interlocking frame and the eyeglasses in separate condition according to the above second preferred embodiment of the present invention.
Figure 7:
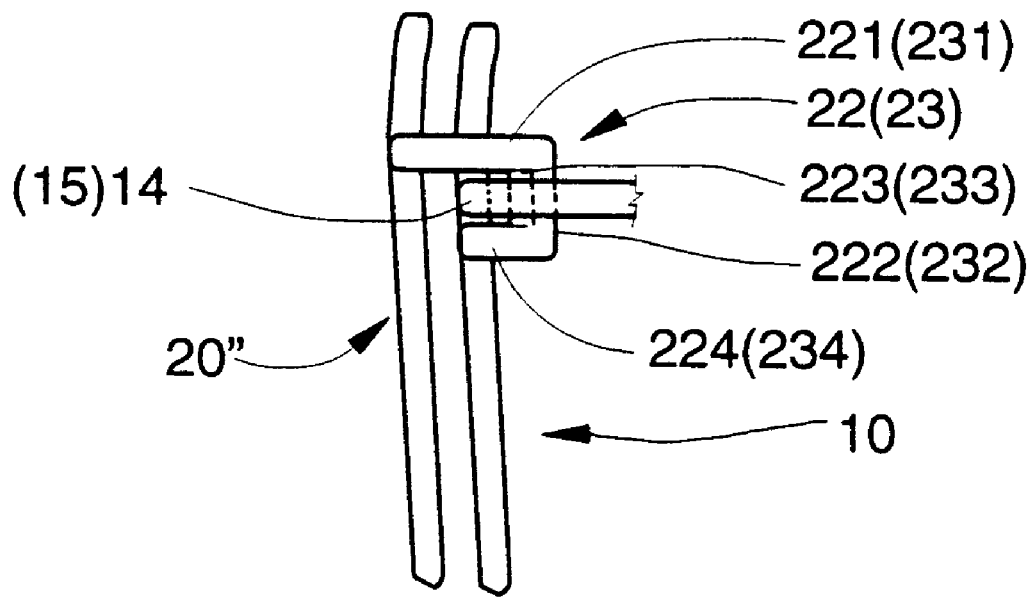
FIG. 7 is a sectional end view illustrating the auxiliary interlocking frame mounted on the eyeglasses according to the above second preferred embodiment of the present invention.

As shown in FIGS. 5 to 7, a second preferred embodiment of the present invention is illustrated, which is an alternative mode of the above first preferred embodiment for better interlocking effect. It has an identical structure as the above first embodiment except that each of the side interlocking means 22, 23 further comprises a locking tail 224, 234 frontwardly extended from a bottom end of the magnetic seat 222, 232. The locking tails 224, 234 are extended to support under the two side extensions 14, 15 of the frame means 10 respectively so as to prevent the auxiliary interlocking frame 20" from moving upwards.

Besides, in this second preferred embodiment, the two magnetic side extensions 14, 15 are embodied to be made of metal having magnetic attraction ability that can attract to magnet but not common metal. Also, the two magnetic seats 222, 232 are made of magnet or embedded with magnet members 223, 233 on front faces thereof, as shown in FIG. 7.

In this second embodiment, the locking tails 224, 234 should not exceed the thickness of the magnetic side extensions 14, 15. Once the magnetic seats 222, 232 attract to the magnetic side extensions 14, 15, the upward movement of the auxiliary interlocking frame 20 is locked by the locking tails 224, 234 at the same time. In order to detach the auxiliary interlocking frame 20" from the primary eyeglasses 10, as shown in FIG. 7, the wearer must push the auxiliary interlocking frame 20" rearwards to separate the magnetic attraction between the two magnetic seats 222, 232 and the two magnetic side extensions 14, 15 and then lift up the auxiliary interlocking frame 20".

Figure 8:
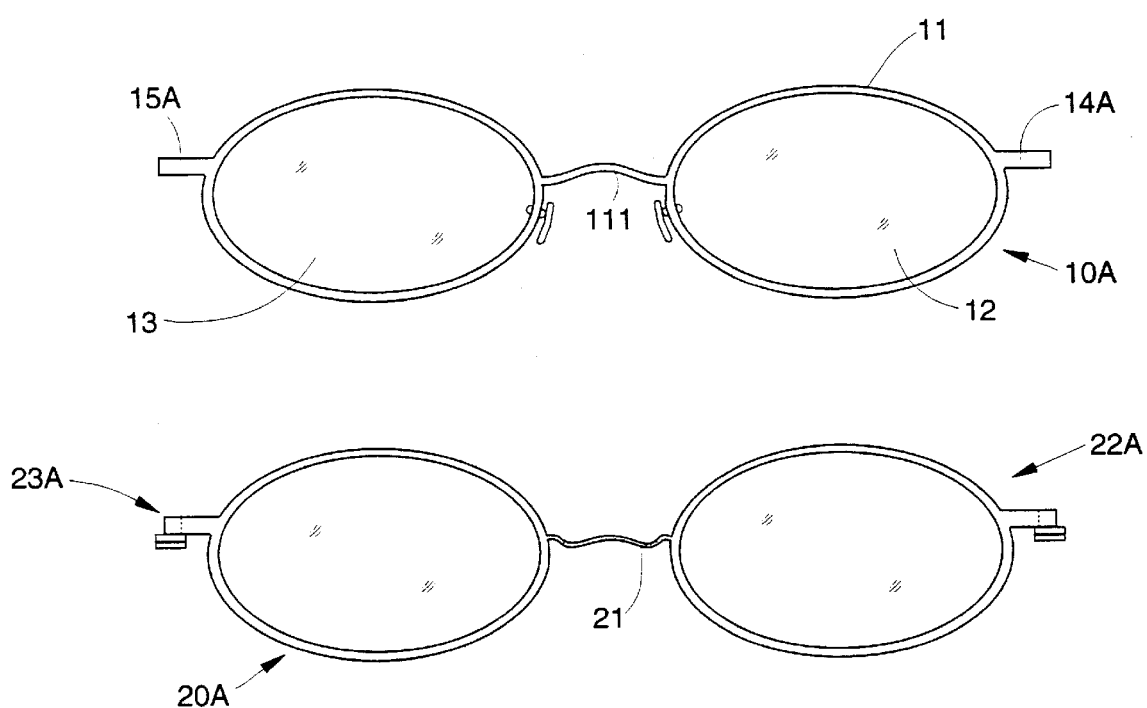
FIG. 8 is front view of an auxiliary interlocking frame for an mounting on in separate condition according to a third preferred embodiment of the present invention.
Figure 9:
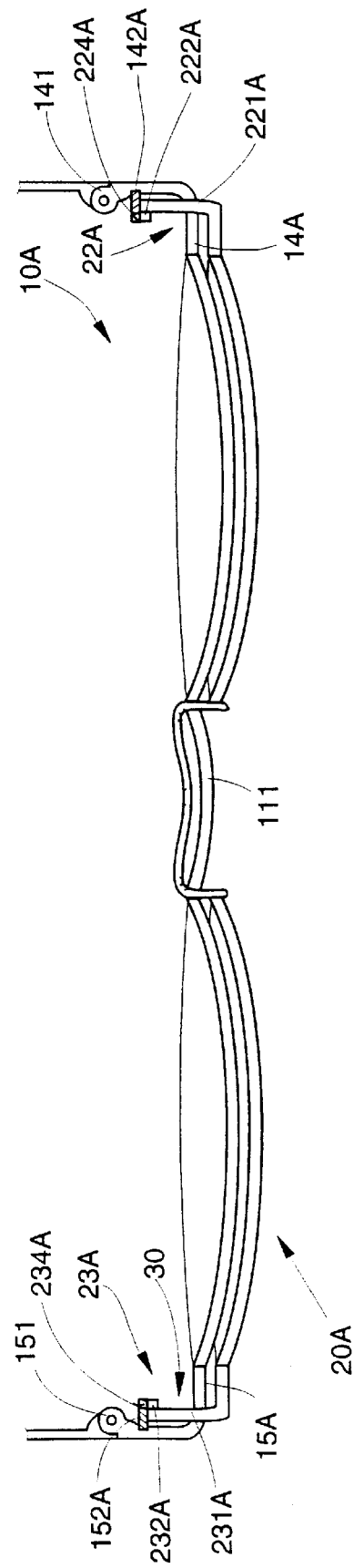
FIG. 9 is a plan view illustrating the auxiliary interlocking frame mounted on the eyeglasses according to the above third preferred embodiment of the present invention.
Figure 10:
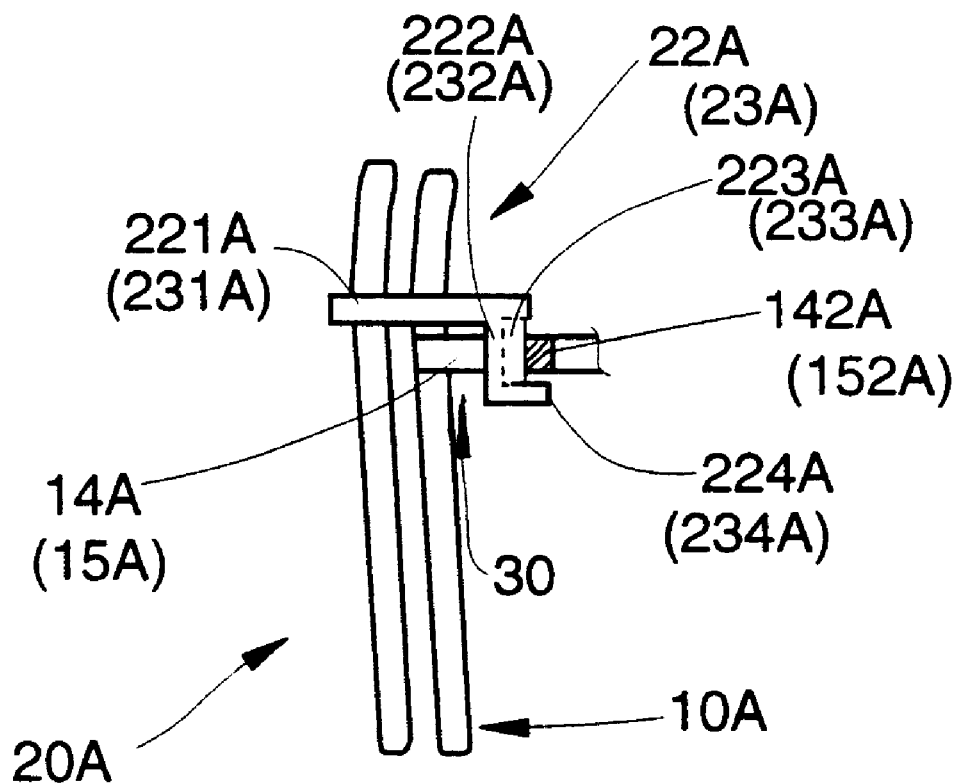
FIG. 10 is a sectional end view illustrating the auxiliary interlocking frame mounted on the eyeglasses according to the above third preferred embodiment of the present invention.

Referring to FIGS. 8 to 10, a third preferred embodiment is introduced to illustrate another alternative mode of the present invention, wherein the two side extensions 14A, 15A are made of non-magnetic material. The two magnet members 142A, 152A are affixed to in front of the two hinges 141, 151 so as to define two gaps 30 between the two magnet members 142A, 152A and the two side extensions 14A, 15A. Besides, as shown in FIG. 10, the two magnet members 223A, 233A are embedded on two rear faces of the two magnetic seats 222A, 232A respectively and the two locking tails 224A, 234A are both extending rearwards. Therefore, to put on the auxiliary interlocking frame 20A, the two magnetic seats 222A, 232A are placed in the two gaps 30, and then the two magnetic seats 222A, 232A will be attracted to engage with the magnet members 142A, 152A of the primary eyeglasses 10A and the locking tails 224A, 234A are locked below the magnet members 142A, 152A too. Accordingly, the auxiliary interlocking frame 20A is mounted on the primary eyeglasses 10A in interlocked manner to prevent unwanted movement in all direction, including frontward, rearward, upward, downward, leftward, or rightward movement.

Figure 11:
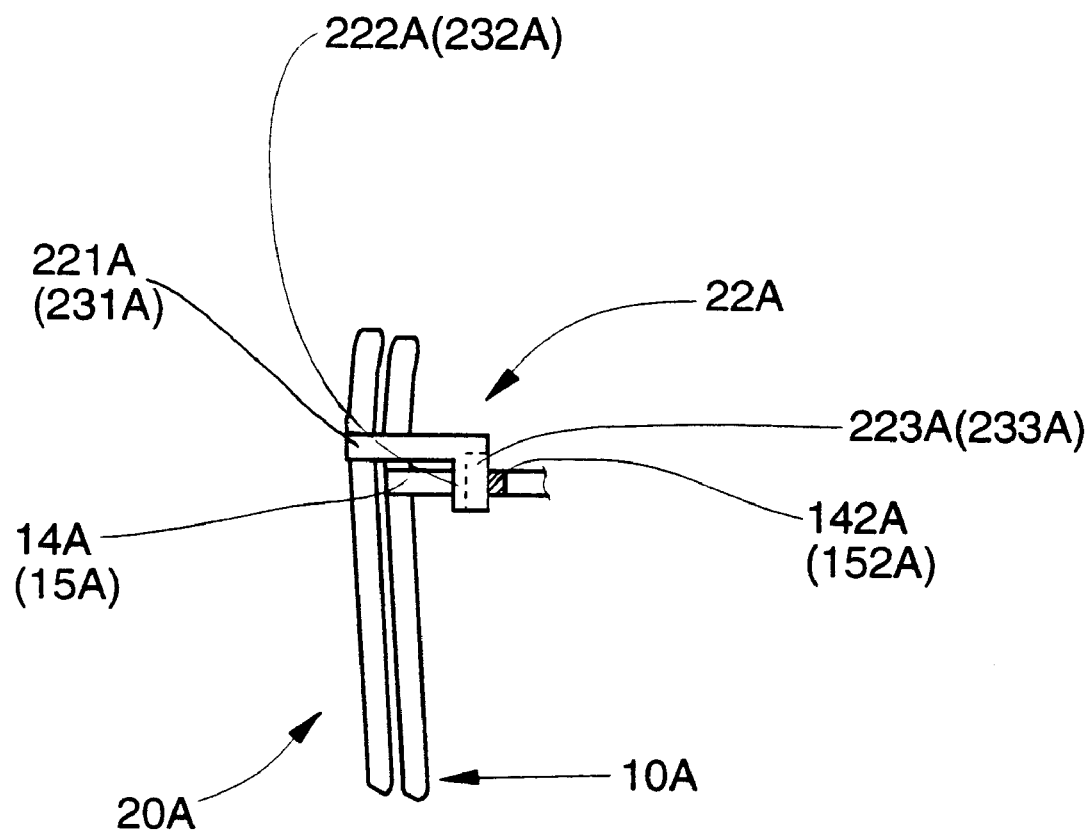
FIG. 11 is a sectional end view of an alternative mode of the above third preferred embodiment of the present invention.

Referring to FIGS. 11, it illustrates an alternative mode of the above third embodiment, wherein the locking tails 142A, 152A are eliminated when the auxiliary interlocking frame 20B is a sunglasses for drivers who would not have up and down movement. Such configuration, like the above first embodiment, especially facilitates the wearer to put on and take off the sunglasses simply by lifting upwards with one hand during driving.

It is worth to mention that, the above first, second and third embodiments of the present invention all are preferred to incorporate the clip-bridge 21 in the auxiliary interlocking frame 20, as shown in FIGS. 4 to 11, so as to provide enhanced engagement. Also, the two magnet members 142A, 152A can be substituted by metal having magnetic attraction ability only (i.e. can be attracted to magnet but not normal metal).

Figure 12:
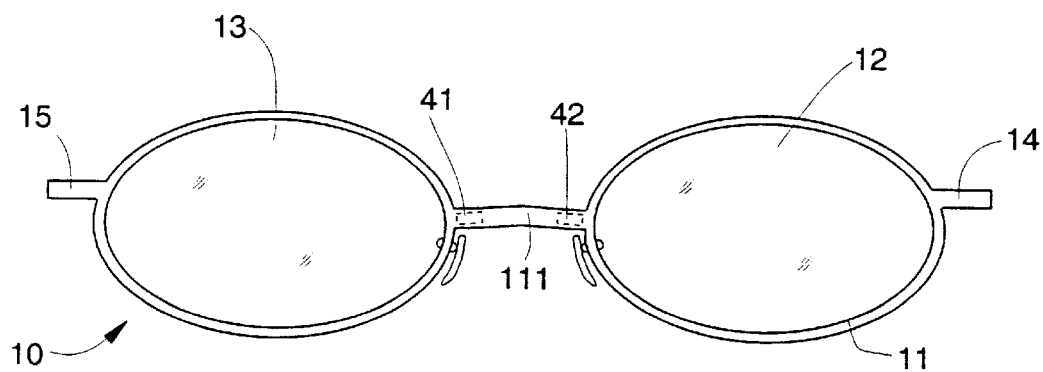
FIG. 12 is front view of an auxiliary interlocking frame for an mounting on in separate condition according to a fourth preferred embodiment of the present invention.
Figure 12:
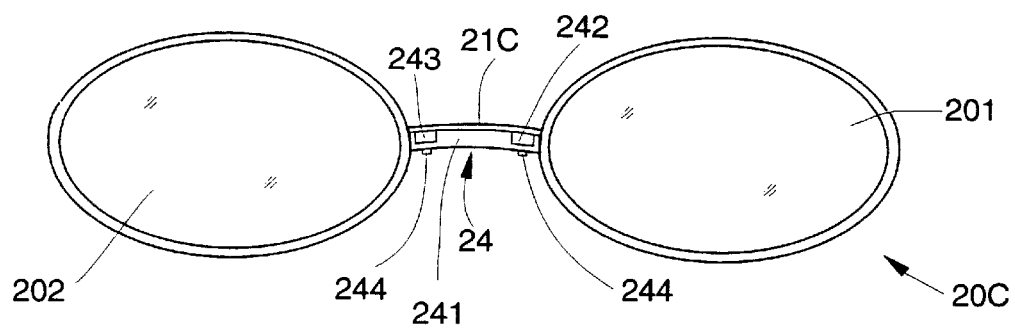
Figure 13:
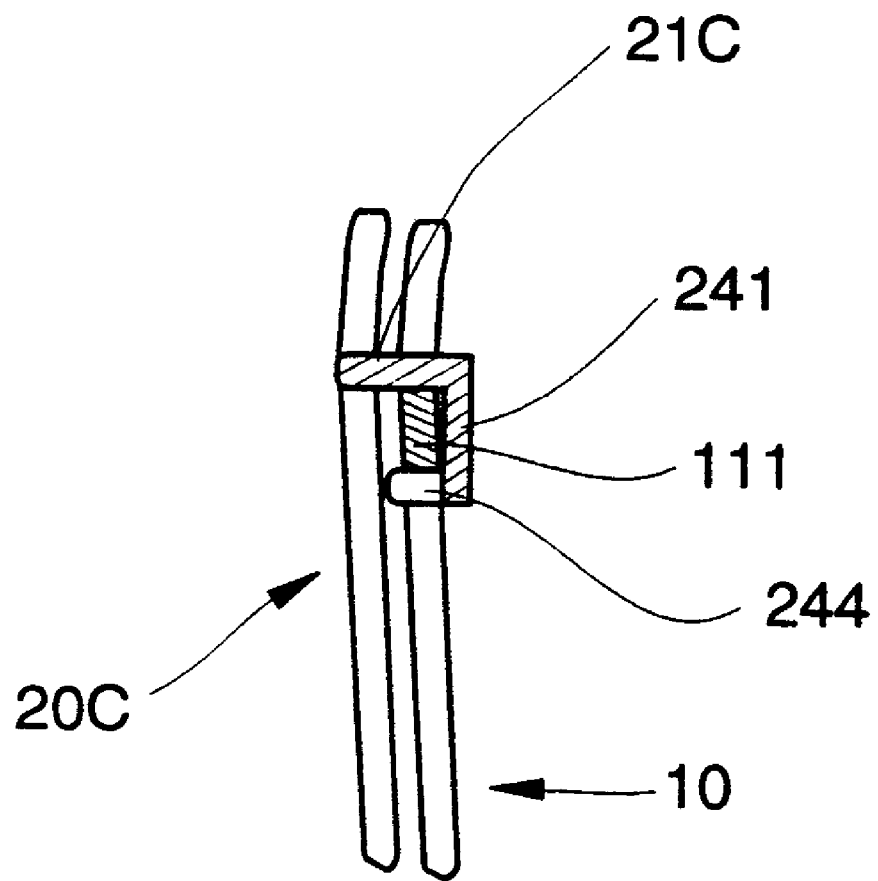
FIG. 13 is a sectional end view illustrating the auxiliary interlocking frame mounted on the eyeglasses according to the above fourth preferred embodiment of the present invention.

Referring to FIGS. 12 and 13, a fourth preferred embodiment of the present invention is illustrated, wherein the primary eyeglasses 10 is constructed to merely comprises a pair of magnet members 41, 42 at two ends of a rear face of the bridge 111 of the frame means 11. The fourth preferred embodiment also comprises an auxiliary interlocking frame 20C for supporting two lenses 201, 202 therein. The auxiliary interlocking frame 20C comprises a central interlocking means 24 attached under a frame bridge 21C. The central interlocking means 24 comprises a magnetic seat 241 extended downwardly from a rear side of the frame bridge 21C and at least one locking tail 244 extended frontwardly from a bottom end of the magnetic seat 241. Two magnet members 242, 243 are embedded on two ends of the magnetic seat 241. Therefore, the auxiliary interlocking frame 20C can be put on the primary eyeglasses 10 by clipping the central interlocking means 24 on the bridge 111, i.e. placing the bridge 111 between the frame bridge 21C and the locking tail 244. The magnetic attraction between the two confronting pairs of magnet members 41, 42 and 242, 243 will further ensure the interlocking condition of the auxiliary interlocking frame 20C mounted on the primary eyeglasses 10.

According to the above fourth preferred embodiment, the mounting relationship between the auxiliary interlocking frame 20C and the primary eyeglasses 10 is also an interlocking configuration that the auxiliary interlocking frame 20C is prevented from falling down or dropping off from the primary eyeglasses 10 in all directions. The frame bridge 21C supports the auxiliary interlocking frame 20C to prevent downward movement. Moreover, the two magnet members 241, 242 on the magnetic seat 241 attract to the two magnet members 41, 42 on the bridge 111, so as to connect the magnetic seat 241 of the auxiliary interlocking frame 20C with the bridge 111 of the primary eyeglasses 10, and thus frontward movement and rearward movement of the auxiliary interlocking frame 20 are limited. The frame bridge 21C and the magnetic seat 241 also block all possible left or right movement of the auxiliary interlocking frame 20C. Besides, the two locking tails 244 also limited the upward movement of the auxiliary interlocking frame 20C. Accordingly, the auxiliary interlocking frame 20 is firmly and securely interlocked with the primary eyeglasses mechanically in all direction, including upward, downward, leftward, rightward, leftward, and rightward movement.

In order to put on the auxiliary interlocking frame 20C, the wear merely needs to bring the auxiliary interlocking frame 20C close to the primary eyeglasses 10 and drop it down. The magnetic attraction between the magnetic seat 241 and the bridge 111 will guide the auxiliary interlocking frame 20C precisely mounted in position. To detach the auxiliary interlocking frame 20C is as easy as: (1) simply push it back to separate the magnetic attraction between the magnetic seat 241 and the magnetic bridge 111; (2) hold up the auxiliary interlocking frame 20C from the primary eyeglasses 10.

In view of the above embodiments, they all have a remarkable feature that none of the conventional magnetic attachable frame includes. The ornamental appearance of the primary eyeglasses 10 of the present invention will not be affected or limited by the magnet members. The designers are free to design the frame style and shape. No body can see the magnet members in front. Even though the auxiliary interlocking frame 20 is mounted on the primary eyeglasses 10, it is still can not find the magnet member. Due to the interlocking configuration suggested in the present invention, the two side extensions 14, 15 or the bridge 111 can be simply made of metal having magnetic attraction ability, i.e. attracting to magnet but not normal metal, and no magnet member is required.

In view of above, the auxiliary interlocking frame for primary eyeglasses according to the present invention substantially contains the following advantages over all kinds of conventional magnetic detachable sunglasses as mentioned in the background of the present invention.

1. The auxiliary interlocking frame can be easily and precisely mounted on primary eyeglasses due to the magnetic attachment. But, once the auxiliary interlocking frame is mounted on the primary eyeglasses, it is interlocked with the primary eyeglasses in at least five directions, so as to prevent the auxiliary interlocking frame from moving or detaching from the primary eyeglasses in downward, inward, outward, leftward, and rightward directions.

2. The auxiliary interlocking frame can further comprises a pair of locking tails extended from a bottom end of the two magnetic seat respectively for rendering the auxiliary interlocking frame to be interlocked with the primary eyeglasses in all directions, so as to prevent the auxiliary interlocking frame from moving or detaching from the primary eyeglasses in downward, upward, inward, outward, leftward, and rightward directions.

3. The clip-bridge of the auxiliary interlocking frame is arranged to capable of clipping on the bridge of the primary eyeglasses, so as to more securely mount the auxiliary interlocking frame on the primary eyeglasses and better prevent the auxiliary interlocking frame from moving downwardly and/or outwardly.

4. The auxiliary interlocking frame can be detached from the primary eyeglasses easily and rapidly with one hand only. Also, the wearer may merely use one hand, during driving or exercising, to put on the auxiliary interlocking frame, wherein when the wearer holds the auxiliary interlocking frame close in front of the primary eyeglasses and drops down, the primary pair of magnet members provided on the primary eyeglasses and/or the corresponding auxiliary pair of magnet members provided on the auxiliary interlocking frame will guide and attract the auxiliary interlocking frame to perfectly mount on the primary eyeglasses.

5. since the auxiliary interlocking frame is interlocked with the primary eyeglasses, the two magnetic side extensions and/or the bridge of the primary eyeglasses can be simply made of metal having magnetic attraction ability, such as iron that is attracted to magnet but not normal metal, so as to further reduce the weight of the primary eyeglasses and provide an ornamental appearance just like a regular eyeglasses.

What is claimed is:

1. An auxiliary interlocking frame adapted for mounting on a primary eyeglasses which comprises a frame means for mounting a pair of lenses in position, wherein said frame means comprises a bridge connected between said two lenses, and two magnetic side extensions each having a hinge portion extended rearwardly therefrom for pivotally coupling a temple; said auxiliary interlocking frame for supporting two auxiliary lenses comprising:

a clip-bridge which is extended between said two auxiliary lenses for fitting behind said bridge of said frame means of said primary eyeglasses, wherein said clip-bridge is in U-shaped and comprises two rearwardly extending side wires adapted for supporting on two ends of said bridge and a downwardly curved clipping wire extending behind said bridge, so that said clip-bridge is clipped on said bridge when said auxiliary interlocking frame is mounted on said primary eyeglasses, and two side interlocking means which are provided at two outer sides of said two auxiliary lenses respectively for interlocking with said two magnetic side extensions of said frame means so as to securely mount said auxiliary interlocking frame on said primary eyeglasses; wherein each of said two side interlocking means comprises a rider arm extended rearwardly for supporting on top of said respective magnetic side extension of said frame means of said primary eyeglasses, a magnetic seat downwardly extended from a rear end of said rider arm, wherein in order to mount said auxiliary interlocking frame on said primary eyeglasses, said two rider arms are ridden on said two magnetic side extensions respectively, said two magnetic seats are attracted from behind with said two side extensions of said frame means of said primary eyeglasses respectively so as to guide said auxiliary interlocking frame firmly engaging with said primary eyeglasses in interlocking manner, and a locking tail frontwardly extended from a bottom end of said magnetic seat for better interlocking effect, wherein said locking tails are extended to support under said two side extensions of said frame means respectively so as to prevent said auxiliary interlocking frame from moving upwards.

2. The auxiliary interlocking frame as recited in claim 1 wherein said two magnetic side extensions are made of metal having magnetic attraction ability that is attracted to magnet but not normal metal.

3. The auxiliary interlocking frame as recited in claim 2 wherein two magnet members are embedded on rear sides of said two side extensions respectively.

4. The auxiliary interlocking frame as recited in claim 3 wherein each of said two magnetic seats is made of magnetized material.

5. The auxiliary interlocking frame as recited in claim 2 wherein each of said two magnetic seats is embedded with a magnet member on a front face thereof.

6. The auxiliary interlocking frame as recited in claim 1 wherein two magnet members are embedded on rear sides of said two side extensions respectively.

7. The auxiliary interlocking frame as recited in claim 6 wherein each of said two magnetic seats is made of magnetized material.

8. The auxiliary interlocking frame as recited in claim 1 wherein each of said two magnetic seats is embedded with a magnet member on a front face thereof.

9. An auxiliary interlocking frame adapted for mounting on a primary eyeglasses which comprises a frame means for mounting a pair of lenses in position, wherein said frame means comprises a bridge connected between said two lenses, two side extensions each having a hinge portion extended rearwardly therefrom for pivotally coupling a temple, and two magnet members affixed in front of said two hinge portions so as to define two gaps between said two magnet members and said two side extensions respectively; said auxiliary interlocking frame for supporting two auxiliary lenses comprising:

a clip-bridge which is extended between said two auxiliary lenses for fitting behind said bridge of said frame means of said primary eyeglasses, and two side interlocking means which are provided at two outer sides of said two auxiliary lenses respectively for interlocking with said two magnetic side extensions of said frame means so as to securely mount said auxiliary interlocking frame on said primary eyeglasses; wherein each of said two side interlocking means comprises a rider arm extended rearwardly for supporting on top of said respective magnetic side extension of said frame means of said primary eyeglasses, and a magnetic seat downwardly extended from a rear end of said rider arm, wherein in order to mount said auxiliary interlocking frame on said primary eyeglasses, said two rider arms are ridden on said two magnetic side extensions respectively, said two magnetic seats are placed in said two gaps and attracted to engage with said magnet members said primary eyeglasses respectively, so as to guide said auxiliary interlocking frame firmly engaging with said primary eyeglasses in interlocking manner.

10. The auxiliary interlocking frame as recited in claim 9 further comprises a locking tail rearwardly extended from a bottom end of said magnetic seat, wherein said locking tails are extended to lock below said magnet members so as to prevent said auxiliary interlocking frame from moving upwards.

11. The auxiliary interlocking frame as recited in claim 10 wherein said clip-bridge is in U-shaped that comprises two rearwardly extending side wires adapted for supporting on two ends of said bridge and a downwardly curved clipping wire extending behind said bridge, so that said clip-bridge is clipped on said bridge when said auxiliary interlocking frame is mounted on said primary eyeglasses.

12. The auxiliary interlocking frame as recited in claim 11 wherein another two magnet members are embedded on two rear faces of said two magnetic seats respectively.

13. The auxiliary interlocking frame as recited in claim 10 wherein another two magnet members are embedded on two rear faces of said two magnetic seats respectively.

14. The auxiliary interlocking frame as recited in claim 9 wherein said clip-bridge is in U-shaped that comprises two rearwardly extending side wires adapted for supporting on two ends of said bridge and a downwardly curved clipping wire extending behind said bridge, so that said clip-bridge is clipped on said bridge when said auxiliary interlocking frame is mounted on said primary eyeglasses.

15. The auxiliary interlocking frame as recited in claim 14 wherein another two magnet members are embedded on two rear faces of said two magnetic seats respectively.

16. The auxiliary interlocking frame as recited in claim 9 wherein another two magnet members are embedded on two rear faces of said two magnetic seats respectively.

* * * * *